Oct. 15, 1940.   E. H. WITTENBERG   2,218,188
PRESSURE COOKER
Filed Feb. 8, 1940   3 Sheets-Sheet 1

INVENTOR
EDWARD H. WITTENBERG
By Paul, Paul & Moore
ATTORNEYS

Oct. 15, 1940.   E. H. WITTENBERG   2,218,188
PRESSURE COOKER
Filed Feb. 8, 1940   3 Sheets-Sheet 2

INVENTOR
EDWARD H. WITTENBERG
By Paul, Paul & Moore
ATTORNEYS

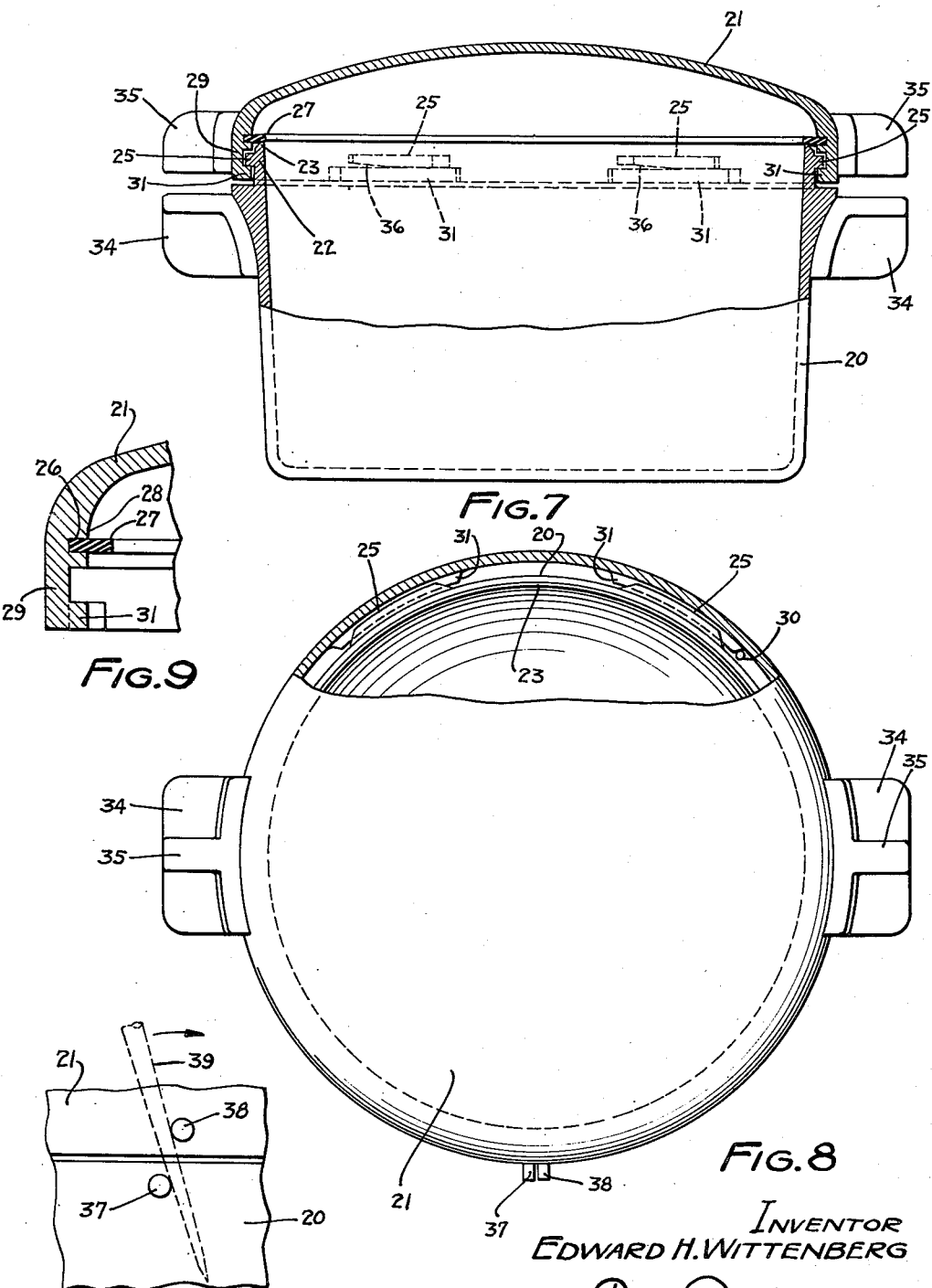

Patented Oct. 15, 1940

2,218,188

UNITED STATES PATENT OFFICE 2,218,188

PRESSURE COOKER

Edward H. Wittenberg, Eau Claire, Wis., assignor to National Pressure Cooker Company, Eau Claire, Wis., a corporation of Wisconsin Application February 8, 1940, Serial No. 317,823

6 Claims. (Cl. 53—2)

This invention relates to new and useful improvements in pressure cookers generally, and more particularly to a novel means for sealing the connection between the cooker body and cover.

In apparatus of the general character herein disclosed, it is highly desirable that the means provided for securing the cover in sealing engagement with the cooker body be relatively simple. Pressure cookers, as now commonly constructed, are usually provided with a plurality of screw devices or other clamping elements for securing the cover to the cooker body in leak-tight relation. Such securing devices are rather inconvenient to manipulate, and obviously add to the cost of manufacture. It is therefore desirable that means be provided whereby the cover may be readily and conveniently applied to the cooker body and secured thereto in seal-tight relation, without requiring the manipulation of several securing elements, each time the cover is secured to the cooker body or removed therefrom.

An object of the present invention therefore is to provide in combination with a container provided with a suitable cover, a simple and inexpensive means for securing the cover to the cooker body in seal-tight relation, which does not require the manipulation of a plurality of separate securing elements, each time the cover is applied to the cooker body or removed therefrom.

A further object is to provide a pressure cooker having an annular seat adjacent to its upper edge adapted to be engaged by a flexible sealing element carried by the cover, and suitable handles being provided on the cooker body and cover, whereby the cover may be relatively rotated with respect to the cooker body, thereby to cause the sealing element to engage the seat on the cooker body and thereby provide a preliminary seal between the cover and cooker body until steam is generated in the cooker and further forces the sealing element into seal-tight engagement with said seat.

A further object is to provide a pressure cooker comprising two members, one constituting the body of the cooker and the other the cover, and a flexible sealing element being carried by one of said members adapted to engage a seat on the other of said members, and cam means being provided on said members adapted to be made operable, when the cover is relatively rotated on the cooker body, whereby to cause the sealing element to engage said seat and provide a preliminary seal between the cover and cooker body and thereby substantially permit the escape of steam from the cooker, when it is initially started.

Other objects of the invention reside in the unique arrangement of the sealing element in the cover; in the interlocking lugs provided on the cover and cooker body, respectively, adapted to be moved into interlocking engagement to cause the sealing element to form a preliminary seal between the cooker body and cover when the cover is relatively rotated on the cooker body; in the provision in a pressure cooker comprising a flexible gasket, suitable cam means, and handles provided respectively on the cooker body and cover whereby the cover may be conveniently rotated on the cooker body, thereby to cause the cam means to force the gasket into sealing engagement with the seat on the cooker body; and, in the simple and inexpensive construction of the cover operating means, whereby the operation of securing the cover to the cooker body in seal-tight relation or removing it therefrom, is greatly facilitated.

Other objects of the invention will appear from the following description and accompanying drawings and will be pointed out in the annexed claims.

In the accompanying drawings there has been disclosed a structure designed to carry out the various objects of the invention, but it is to be understood that the invention is not confined to the exact features shown as various changes may be made within the scope of the claims which follow.

In the drawings:

Figure 7 is a view showing a cooker of larger capacity, with the invention embodied therein;

Figure 8 is a plan view of Figure 7, partially in section;

Figure 9 is a detail sectional view showing the manner of securing to the cover, the sealing element shown in Figure 7;

Figure 10 is a fragmentary view showing the means provided on the cover and cooker body to facilitate initially releasing the cover from the cooker body, when it is desired to remove the cover therefrom;

Figures 1, 11, 12:
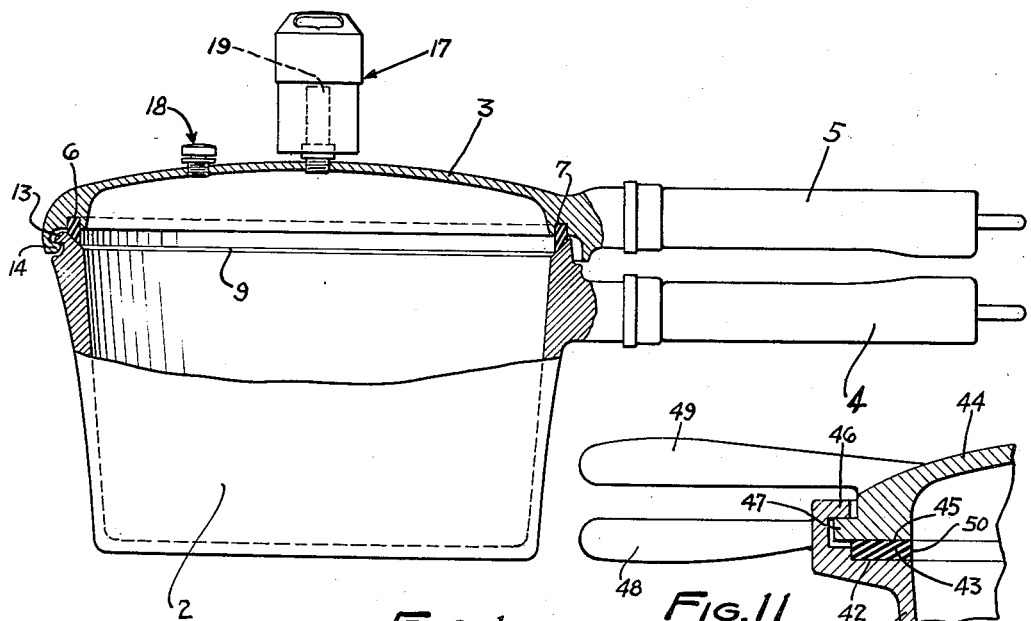
Figure 1 is a side elevational view of a pressure cooker, partially in section, showing the cover secured to the cooker body in seal-tight relation.
Figure 11 is a view showing another construction wherein a flat gasket is shown supported in a seat provided in the cooker body.
Figure 12 is a view showing a construction in which a differently shaped gasket is used.
Figure 2:
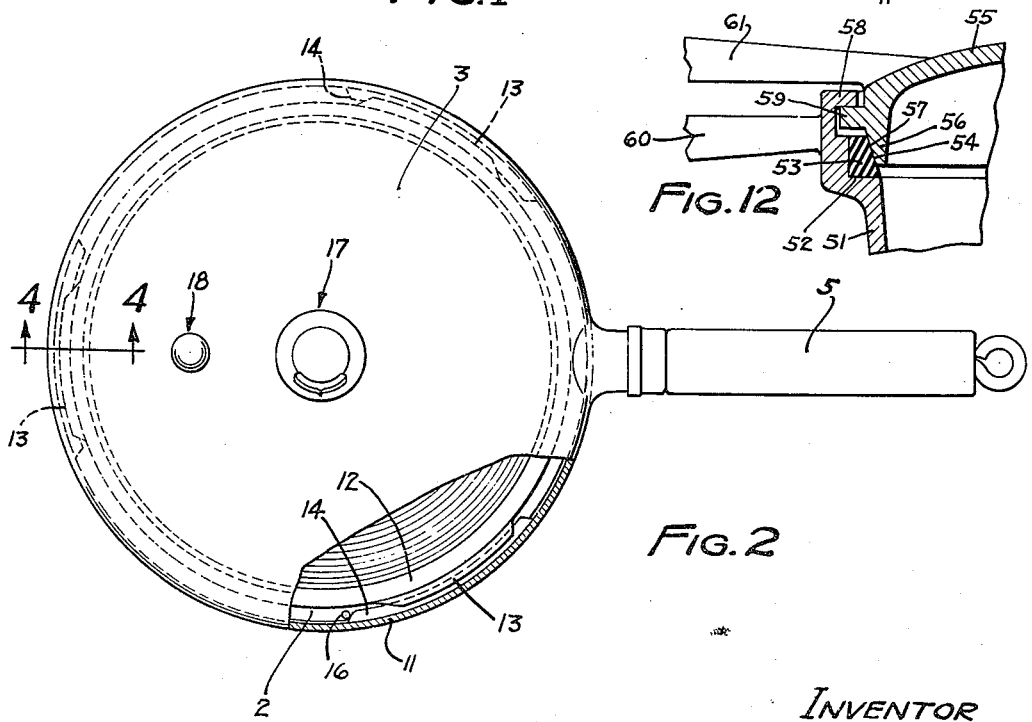
Figure 2 is a plan view of Figure 1, partially broken away to show the interlocking engagement of the lugs provided on the cover and cooker body, respectively.

In the selected embodiment of the invention herein disclosed, there is shown in Figures 1 and 2, a cooker comprising a body 2 and a cover 3 provided with handles 4 and 5, respectively. These handles are preferably so arranged that when the cover is in sealing engagement with the cooker body, the handles are disposed, one over the other, as clearly illustrated in Figures 1 and 2.

Figure 4:
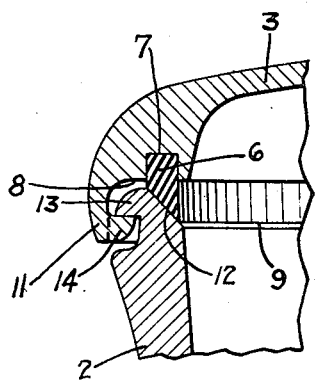
Figure 4 is an enlarged detail sectional view on the line 4—4 of Figure 2, showing a sealing element having a depending exposed edge.
Figure 5:
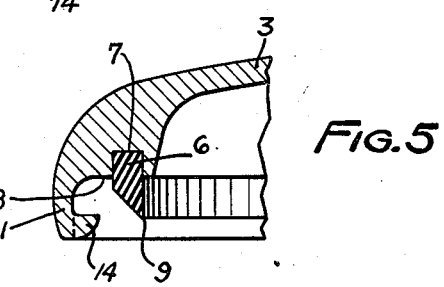
Figure 5 is a detail sectional view of a portion of the cover only, showing the gasket secured thereto.

An important feature of the present invention resides in the means provided for sealing the connection between the cover and cooker body to prevent the escape of steam therefrom, when the cooker is in use, and the handles 4 and 5 are in cover-securing position. Such a means is shown in Figures 1, 4, and 5, and may comprise a flexible sealing element or gasket 6, preferably constructed of rubber, and having a portion thereof received in an annular groove 7 provided in the cover 3. The lower portion of the gasket 6 extends below a horizontal face 8 provided in the cover, as best shown in Figure 5, and is preferably V-shaped, whereby the gasket may be provided with a knife edge 9 which may readily yield to pressure, as will subsequently be described. The cooker body 2 is shown having a beveled seat 12, adapted to be engaged by the outer conical face of the gasket 6, as best shown in Figure 4.

The outer marginal edge portion of the cover terminates in a depending flange 11, which extends below the knife edge 11 of the gasket 6, as shown in Figure 5, whereby the cover may be placed on a table or other support without the gasket contacting said support.

Figure 6:
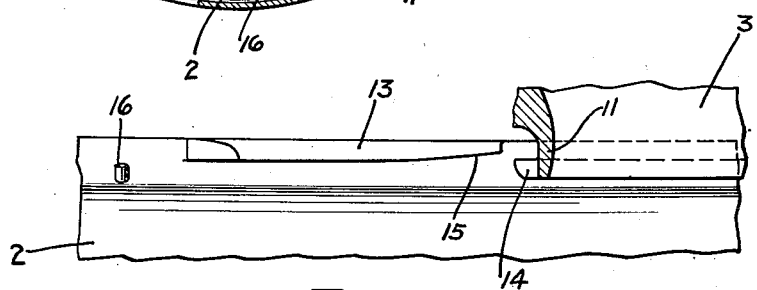
Figure 6 is a fragmentary detail view showing the cam means provided for forcing the sealing element into preliminary sealing engagement with the seat on the cooker body.

Another important feature of the invention resides in the provision of cam means for initially forcing the gasket into seal-tight engagement with the cooker body, when the cover is relatively rotated thereon. The means provided for thus initially forcing the depending portion of the gasket into seal-tight engagement with the seat 12, is shown comprising a plurality of outwardly directed lugs 13, provided on the upper marginal edge portion of the cooker body 2 and a plurality of inwardly directed lugs 14 provided on the cover, as clearly illustrated in Figures 4, 5, and 6. The lugs 13 on the cooker body are spaced equi-distant apart around the circumference of the upper edge of the cooker body, and the lugs on the cover are similarly spaced. The gaps provided between the lugs on the cooker body and also the lugs on the cover, are relatively longer than the length of said lugs, whereby the cover lugs may readily pass between the cooker body lugs, when placing the cover on the cooker or removing it therefrom.

To effect the cam action hereinbefore referred to, the leading ends of the lugs 13 of the cooker body are beveled, as shown at 15, whereby when the cover lugs 14 engage the lugs 13, the cover is forced slightly downwardly with respect to the cooker body, whereby a preliminary seal is provided between the gasket 6 and seat 12 of the cooker body. If desired, the leading ends of the lugs 14 of the cover may be beveled in a manner similar to the lugs 13 of the cooker body, but in actual practice, I have found it necessary to bevel but one set of lugs, that is, either the lugs on the cooker body, or the lugs on the cover.

Figure 3:
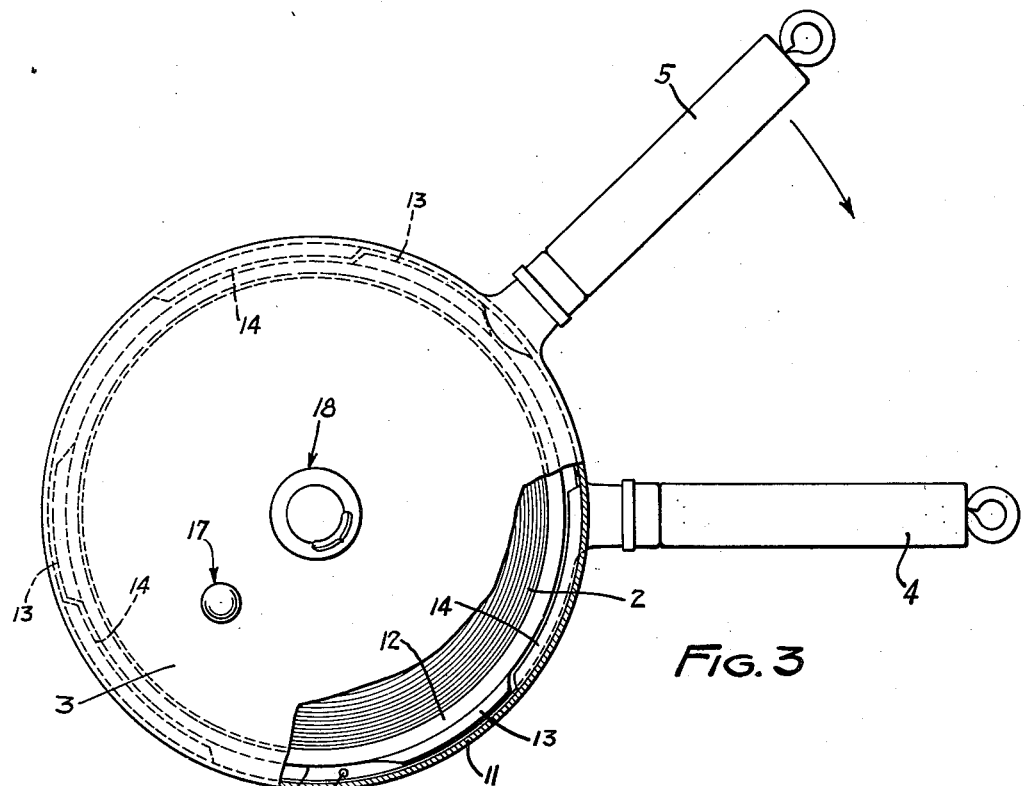
Figure 3 is a view similar to Figure 2, but showing the cover unsecured to the cooker body and positioned for removal therefrom.

Means is provided for limiting rotation of the cover 3 on the cooker body, when securing the cover thereto. Such means is shown comprising a small detent 16, provided on the upper marginal edge of the cooker body in position to be engaged by one of the lugs 14 of the cover, as will readily be understood by reference to Figures 3 and 6. For convenience, the detent 16 may be in the form of a small pin suitably fixed to the cooker body. The detent 16 is so located that when the handle 5 of the cover is swung into cover-closing position, directly over the handle 4 of the cooker body, as shown in Figures 1 and 2, the leading end of one of the lugs 14 on the cover will abuttingly engage said detent and thereby limit further rotary movement of the cover in that direction. When the handles are positioned, one over the other, as above stated, the cooker with the cover secured thereto, may readily be carried about from place to place without danger of the cover accidentally becoming detached from the cooker body.

A suitable indicator, generally indicated by the numeral 17, is preferably provided on the cover 3 of the cooker to indicate the pressure within the cooker. The indicator 17 may be supported on the upper end of a tubular post 19, provided on the cover, as indicated in Figure 1. A suitable pressure release valve 18 may also be provided in the cover for preventing excessive pressure developing therein.

The novel cooker herein disclosed, is extremely simple and inexpensive in construction. The means provided for securing the cover to the cooker body in seal-tight relation, is very simple and may readily be cleansed, as will readily be understood by reference to Figures 1, 4, and 5. By arranging the handles 4 and 5 as shown in Figures 1 and 2, the operation of applying the cover to the cooker body or removing it therefrom is greatly facilitated. To secure the cover to the cooker body in seal-tight relation, it is only necessary to swing the cover handle 5 to a position over the cooker body handle 4, as shown in Figures 1 and 2, whereby the camming action resulting from the interlocking engagement of the lugs 13 and 14 of the cooker body and cover, respectively, will force the gasket 6 into preliminary sealing engagement with the seat 12 of the cooker body. As steam is generated within the cooker body, the pressure of the steam will gradually force the depending portion of the gasket 6 into closer contact with the seat 12, whereby the greater the pressure within the cooker body, the more tightly the gasket is forced into engagement with the beveled seat 12. Before removing the cover from the cooker body, the pressure is released from the cooker body by manipulation of the pressure indicating device 17, after which the cover may readily be removed from the cooker without danger. Other means, not shown, may be provided for releasing the steam from the cooker body before removing the cover therefrom.

In Figures 7 to 10, inclusive, the invention is shown applied to a cooker of larger capacity than the one shown in Figures 1 and 2. The cooker shown in Figures 7 and 8 comprises a body 20 and cover 21. The body 20 is shown provided at its upper portion with a cylindrical portion 22, the upper edge 23 of which provides a seat for a sealing element as will subsequently be described. A plurality of outwardly directed lugs 25 are provided on the periphery of the cylindrical portion 22, and are spaced equi-distant apart around the circumference thereof.

The cover 21, as best shown in Figure 9, has formed therein an inwardly facing annular groove 26, adapted to receive a flexible sealing element or gasket 27, preferably of rubber. The width of the gasket 27 is relatively greater than the depth of the recess 26, whereby the inner marginal edge portion of the gasket 27 projects beyond the inner face 28 of the cover.

The cover 21 is shown provided with an annular depending flange or skirt 29 having inwardly directed lugs 31 thereon adapted to interlockingly engage the lugs 25 of the cooker body, when the cover 21 is rotated to a predetermined position on the cooker body. The cylindrical portion 22 of the cooker body cooperates with the inner faces 33 of the cover lugs 31 to center the cover on the cooker body. When the cover is placed on the cooker body and is relatively rotated thereon, the lugs 31 of the cover may be moved into interlocking engagement with the lugs 25 of the cooker body, thereby to force the gasket 27 into preliminary sealing engagement with the upper edge 23 of the cooker body. The upper exposed portion of the gasket 27 is exposed to the action of the steam within the cooker body, whereby steam generated in the cooker will force the gasket tightly into sealing engagement with the upper edge 23 of the cooker body, when the cooker is operating. Suitable means, not shown, is provided on the cooker body for relieving the cooker of excessive pressure, as is customary in structures of this general type.

Suitable operating handles 34 and 35 are provided on the cooker body and cover, respectively, as shown in Figures 7 and 8, to facilitate relatively rotating the cover on the cooker body to move the lugs 25 and 31 into or out of locking engagement with each other. The leading ends of the lugs 25 on the cooker body are preferably beveled, as shown at 36 in Figure 7, to effect a camming action, when the cover lugs 31 engage the lugs 25, thereby to force the gasket 27 into preliminary sealing engagement with the upper edge of the cooker body.

A suitable stop pin 30, similar to the detent 16, shown in the preceding figures, is provided for limiting relative rotation of the cover 21 on the cooker body 20, so that when the handles 34 and 35 are positioned, one over the other, as shown in full lines in Figures 7 and 8, the lugs 25 and 31 will be interlocked.

In relatively larger cookers, such as shown in Figures 7 and 8, it is desirable that means be provided for initially breaking the seal or bond between the gasket 27 and the upper edge of the cooker body, when the cover is to be removed from the cooker. To thus initially break the seal between the gasket 27 and the upper edge 23 of the cooker body, suitable pins or lugs 37 and 38 may be provided on the cooker body and cover respectively, as shown in Figure 10. These pins are preferably arranged as shown, whereby a suitable instrument as, for example, an ice pick, as indicated at 39, may be inserted between the pins, and when moved in the direction of the arrow in Figure 10, will forcibly rotate the cover on the cooker body to break the seal between the gasket 27 and its seat 23. The cover may then be readily rotated upon the cooker body by manipulation of the handles 34 and 35, in a manner similar to the cover shown in Figures 1 and 2.

Figure 11 illustrates another form wherein a cooker body 41 is shown provided with a horizontally disposed seat 42 adapted to receive a flexible sealing element or gasket 43. The cover 44 has a horizontally disposed face 45 adapted to engage the upper face of the sealing element 43. Interlocking lugs 46 and 47 are provided on the cooker body and cover, respectively, adapted to be moved into interlocking engagement to secure the cover to the cooker body. The lugs 47 of the cover may have their leading edges beveled in a manner similar to the lugs shown in the previous figures, thereby to provide a camming action, when the lugs 46 and 47 are moved into interlocking engagement. This camming action, as in the previous figures, imparts relative axial movement between the cooker body and cover, and thereby provides a preliminary seal between the cover and sealing element.

Suitable operating handles 48 and 49 are provided on the cooker body and cover, respectively, whereby the cover may be conveniently rotated with respect to the cooker body to move the lugs 46 and 47 into or out of interlocking engagement.

In the construction shown in Figure 11, the inner edge 50 of the sealing element 43 is exposed to the pressure of the steam within the cooker, whereby when pressure develops in the cooker, the inner edge 50 of the gasket may be forced slightly outwardly, thereby further compressing the gasket between the faces 42 and 45 of the cooker body 41 and cover 44, respectively.

Figure 12 illustrates another form in which a cooker body 51 is shown provided with a seat 52 adapted to receive a suitable flexible sealing element or gasket 53. The inner face 54 of the sealing element 53 is beveled, as shown. A cover 55 is shown having a depending flange 56 provided with a tapered face 57 adapted to engage the sealing element 53. Suitable lugs 58 and 59 are provided on the cooker body 51 and cover 55, respectively, adapted to be moved into interlocking engagement by relative rotation of the cover on the cooker body. Suitable operating handles 59 and 60 are provided for operating the cover on the cooker body to move the lugs 58 and 59 into or out of sealing engagement with one another.

In the form shown in Figure 12, when the cover is forced downwardly by the camming action provided between the lugs 58 and 59, the co-acting beveled faces 54 and 57 of the sealing element 53 and cover 55, respectively, will firmly compress the sealing element in the seat 52 and thereby provide a leak-tight joint between the cooker body and cover.

I claim as my invention:

1. In an apparatus of the class described, a body provided with a laterally extending operating handle, a seat in the upper portion of said body, a cover for said body having an annular sealing element secured to and projecting from the cover and adapted to engage said seat, a laterally extending operating handle on the cover, cam means associated with the cover and body and adapted to be concealed by the cover when on said body member, said cam means made operable by relative rotation of the cover on said body, by manipulation of said handles, thereby to cause the sealing element to engage said seat and provide a seal between said body and cover, said handles being so arranged that when they are disposed, one closely adjacent and over the other to form in effect a single handle for the vessel, the cam means is rendered operative to secure the cover to said body, and when the cover handle is disposed at an angle with respect to the body handle, the cam means is rendered inoperative and the cover is released from said body.

2. In an apparatus of the class described, a body provided with a laterally extending operating handle, an annular seat in the upper portion of said body, a cover for said body having a flexible sealing element projecting therefrom and adapted to engage said seat, when the cover is placed on said body, a laterally extending operating handle on the cover, and cam means associated with the cover and body and adapted to be concealed by the cover when on said body member and present an unbroken circumferential line therebetween, said cam means made operable by relative rotation of the cover on said body, by manipulation of said handles, thereby to impart relative axial movement to the cover whereby to partially compress the sealing element and provide a preliminary seal between said body and cover, said sealing element having a portion thereof exposed to the interior of said body, when the cover is secured thereto, whereby pressure within said body will force the sealing element more tightly into engagement with said seat.

3. In an apparatus of the class described, a container having an upstanding flange disposed inwardly of the periphery of the container, a plurality of circumferentially spaced lugs formed on said upstanding flange, said lugs lying within the confines of the periphery of the container, a cover for said container having a top and a depending side wall, a plurality of circumferentially spaced and inwardly directed lugs formed on the inner surface of the side wall of said cover, said last mentioned lugs being adapted to engage beneath the lugs on said container upon rotation of the cover with respect to the container thereby to lock the two together, said container and cover presenting a smooth unbroken circumferential line at the joint between the two, and a sealing element interposed between the container and cover and adapted to form a seal therebetween.

4. In an apparatus of the class described, a container having an upstanding flange disposed inwardly of the periphery of the container, a plurality of circumferentially spaced lugs formed on said upstanding flange, said lugs lying within the confines of the periphery of the container, a cover for said container having a top and a depending side wall, a plurality of circumferentially spaced and inwardly directed lugs formed on the inner surface of the side wall of said cover, said last mentioned lugs being adapted to engage beneath the lugs on said container upon rotation of the cover with respect to the container thereby to lock the two together, said container and cover presenting a smooth unbroken circumferential line at the joint between the two, and a sealing element secured to and projecting from the inner wall of the cover, said sealing element being adapted to engage said container when the cover is applied thereto to form a seal therebetween.

5. In an apparatus of the class described, a container having an upstanding flange disposed inwardly of the periphery of the container, a plurality of circumferentially spaced lugs formed on said upstanding flange, said lugs lying within the confines of the periphery of the container, a handle projecting laterally from said container, a cover for said container provided with a laterally projecting handle, said cover having a top and a depending side wall, a plurality of circumferentially spaced and inwardly directed lugs formed on the inner surface of the side wall of said cover, said last mentioned lugs being adapted to engage beneath the lugs on said container upon rotation of the cover by its handle with respect to the container thereby to lock the two together, said container and cover presenting a smooth unbroken circumferential line at the joint between the two and both of said handles being in vertical alignment when the cover is locked to the container, and a sealing element secured to and projecting from the inner wall of the cover, said sealing element being adapted to engage said container when the cover is applied thereto to form a seal therebetween.

6. In an apparatus of the class described, a body member provided with a laterally extending operating handle, a cover member for said body member having a laterally extending handle, an annular seat on one of said members, a flexible sealing element carried by the other of said members and adapted to engage said seat when the cover is positioned on said body member, cam means associated with the cover and body member and lying within the confines of the periphery of said body member and made operable by relative rotation of the cover on said body member by manipulation of said handles, thereby to cause the sealing element to engage said seat and partially compress said sealing element to provide a preliminary seal between said body member and cover, said cover and body member presenting a smooth unbroken circumferential line at the joint between the two, said handles being so arranged that when they are disposed, one closely adjacent and over the other to form in effect a single handle for the vessel, the cam means is rendered operative to secure the cover to the body member, said sealing element having a portion thereof exposed to the interior of said body member and so disposed with respect to the seat that when the cover is secured thereto, pressure within said body will force the sealing element more tightly into engagement with said seat, and when the cover handle is disposed at an angle with respect to the body handle, the cam means is rendered inoperative and the cover is released from said body.

EDWARD H. WITTENBERG.

DISCLAIMER 2,218,188.— *Edward H. Wittenberg*, Eau Claire, Wis. PRESSURE COOKER. Patent dated Oct. 15, 1940. Disclaimer filed Jan. 18, 1947, by the assignee, *National Pressure Cooker Company.*

Hereby enters this disclaimer to claims 3, 4, and 5 of said patent.

[*Official Gazette February 25, 1947.*]